Jan. 31, 1961 R. GIANNONI 2,969,920
FOG DISPERSAL SYSTEM, PARTICULARLY FOR AIRPORT RUNWAYS
Filed Jan. 27, 1958 2 Sheets-Sheet 2

INVENTOR.
R. Giannoni
BY
Richards Geier
ATTORNEYS

United States Patent Office 2,969,920
Patented Jan. 31, 1961

2,969,920

FOG DISPERSAL SYSTEM, PARTICULARLY FOR AIRPORT RUNWAYS

Roberto Giannoni, Via Paolo Toscanelli 2, Florence, Italy

Filed Jan. 27, 1958, Ser. No. 711,312

1 Claim. (Cl. 239—14)

An object of this invention is to solve the problem of fog dispersal in areas where visibility is a particularly important factor, such as railway marshaling yards, sidings, highway crossings, sport fields, street intersections and the like, and in particular airport runways.

Described below is the physical principle upon which the invention is based and the plant which embodies the said principle. Let us consider, for instance, the runway of an airport covered with the densest possible fog. At medium latitudes the ambient air temperatures, under these conditions, will be around 0° C. and the moisture content may be as high as 4 gr. per cubic meter in the vapor state, plus 1 gr. per cubic meter in the liquid state as minute droplets in suspension, the surface tension of which is in equilibrium with the tension of the surrounding vapor. A beam of light hitting one of these droplets hits a liquid surface, and is therefore partly reflected, partly refracted and for the most part absorbed. When the fog is thick, and consequently these droplets are very numerous and closely spaced, a layer of the thickness of a few meters prevents the passage of the most intensive light.

The methods thus far proposed and experimented with a view to obtaining fog dispersal in given areas tend to eliminate the presence of these droplets either by evaporation (by increasing their temperature and maintaining it above ambient air temperature), or by coalescence, i.e. by causing them to agglomerate together into bigger drops, and then causing their fall in the form of rime or dew by cooling and by chemical or electric agents or other methods.

Let us now suppose, instead, that we take part of this air and compress it, say, to 4 atmospheres and lower its temperature, for instance, down to minus 40° C. Whatever the temperature was before compression, and whatever the total moisture contents (liquid plus vapor), i.e. regardless of whether tropical fogs or arctic fogs are involved, by the combined effect of pressure and temperature all of the existing water is converted into ice (and therefore is separated from the air) at a vapor tension which, at the said temperature of minus 40° C. is close to zero.

It should be noted in particular that in the crust of ice which sticks to the cold walls of the containers are embedded the minute solid particles that are present in suspension in the air (dust, soot, etc.) which, having a specific heat lower than of $H_2O$, constitute in the free atmosphere the moisture condensation nuclei, and contribute to the formation and stabilisation of fog droplets.

Let us now release this air thus dehydrated in the area to be cleared from fog. As an effect of pressure, it will expand and tend to resume its original volume, as far as permitted by the further decrease in temperature due to its own expansion and to the evaporation of the liquid ambient $H_2O$, and will mix with four volumes of air to be cleared from fog. These five volumes (4+1) will have a moisture content of four fifths of the original; the number of $H_2O$ molecules free in the vapor state will become proportionally smaller and will result in molecules passing from the liquid to the vapor state, whatever the temperature created as a result of expansion and evaporation. If this injection of dry air takes place continuously, absolute moisture and consequently relative moisture are decreased to the point of perfect transparency in an ambient of relatively dry and cold air, hence more dense and stable air within the surrounding medium.

These concepts were embodied in the plant which forms the subject of this invention, and which is described hereinafter with special reference to the fog dispersal in an airport runway.

The description will be more easily understood by referring to the enclosed drawings, which represent a preferred embodiment thereof by way of a non-limiting example.

In the drawings:

Fig. 8 is a detail of a freezing box.

Figure 1:
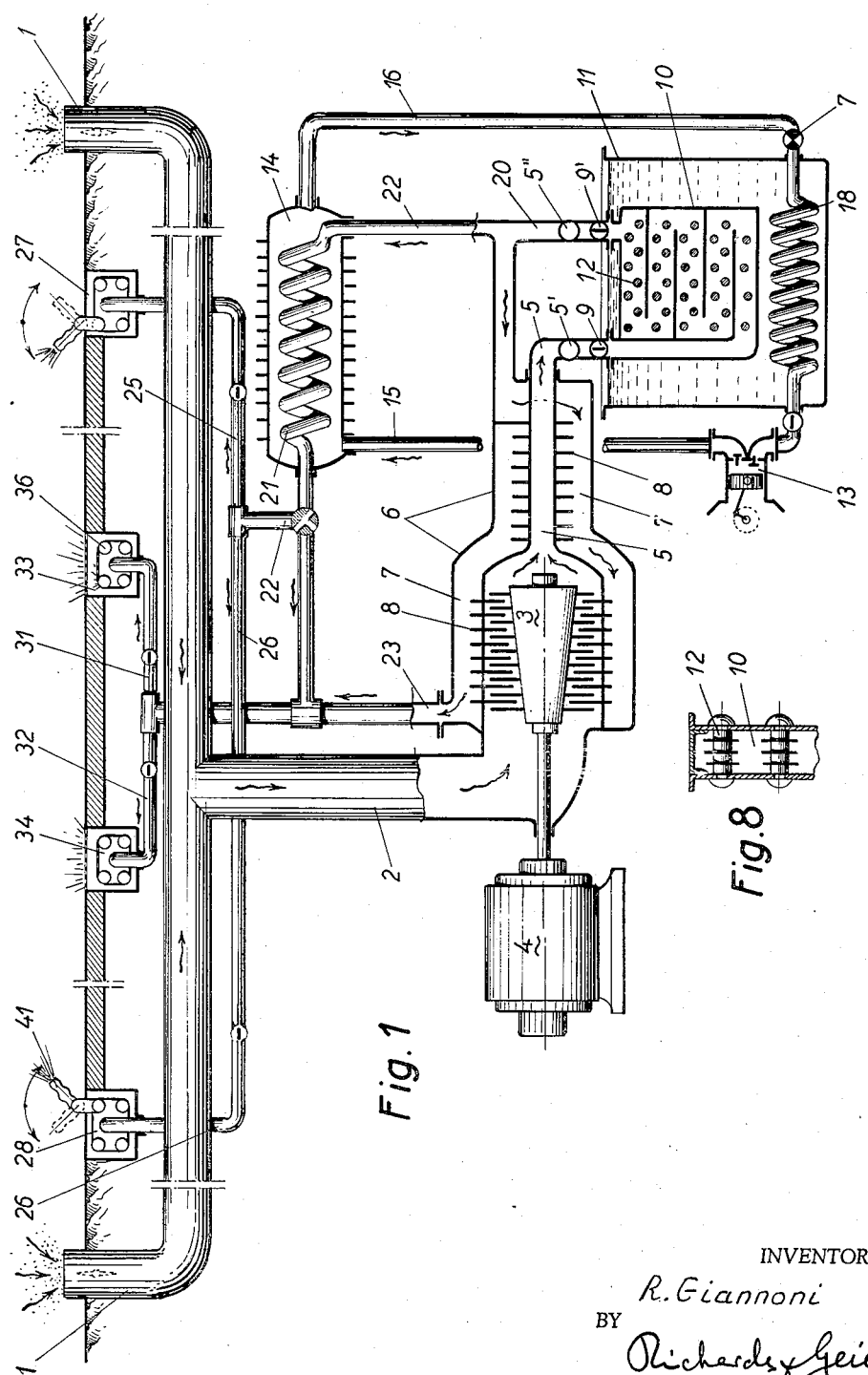
Fig. 1 represents the general arrangement of the plant.

With reference to Fig. 1, the plant consists of the following major components:

(a) An air compressor of suitable capacity;

(b) A refrigerating unit designed to create a sufficiently low temperature in a tank containing glycol or other non-freezing fluid. Into this tank are immersed freezing boxes arranged in parallel and easily replaceable, as described below;

(c) A system of heat exchangers intended to recover part of the heat generated in compressing the air and in condensing and freezing water, and above all to reduce the required refrigerating unit capacity;

(d) A system of pipes to draw in the ambient air;

(e) A system of pipes to distribute conditioned air, in two separate corridors, in the center and on the sides of the runway, as indicated below.

According to the invention, the ambient air is drawn in through a series of intakes 1 connected by a manifold 2 which leads to the suction end of an axial rotary compressor 3 (or a compressor of other suitable type), driven by an electric motor 4 of suitable power. The compressed air which through compression assumes a high temperature, is driven into a pipe 5 laid along the axis of a casing 6 which surrounds also the compressor 3, forming a space 7 which is crossed by a backflow of cold dried air forced to circulate therein through the blades 8 fitted to the outer walls of both the axial compressor and the pipe 5.

This pipe 5 leads into a manifold 5', and from this through a number of outlets 9 the compressed air flows into a plurality of boxes 10, each of which receives the compressed air from one of the outlets 9 and returns it through the outlets 9'. These outlets 9 and 9' are arranged in rows facing each other, and the boxes 10 are arranged in parallel (Fig. 1) in a tank 11 filled with gycol or other non-freezing fluid, in which a temperature of around minus 40° C. is maintained.

The boxes are of sheet metal, of flat shape, and fitted inside with baffles which force the air circulating under pressure inside them to follow a labyrinth path, with a view to retaining the air for a longer time inside the boxes, and to forcing to it flow against the walls, transferring most of its heat to the glycol bath. To this same end the boxes 10 are also provided—perpendicularly to their walls, i.e. perpendicularly to the plane of the drawing, with a number of screwed tie rods 12 (Fig. 8), which have a static function and a thermal function: they prevent the walls from swelling, even if they are quite thin in order to facilitate the exchange of heat between the hot air and the non-freezing fluid, and they facilitate, by conduction, the passage of heat from the inside to the outside of the box.

Flowing out of the outlets 9' the air reaches the manifold 5" which is about as long as the tank 11, and since inside the boxes 10 the compressed air from the pipe 5 has undergone a strong cooling, it has transferred to the walls of the boxes its moisture, which became converted into ice. This is the reason why there must be many boxes, and why they must be frequently replaced for defrosting. This is easily effected by providing quick-acting connectors, which, for instance, can be similar to those used for connecting compressed-air railroad brakes.

The non-freezing fluid into which the boxes 10 are immersed is maintained at a low temperature (approximately minus 40° C.) by means of a refrigerating plant of any known type. In the example shown in Fig. 1, the circulation of the cooling fluid, which can be ammonia, sulfur dioxide, carbon dioxide or other, takes place in opposition to that of the cooled air from the pipe 20, in the following manner: the cooling fluid, by means of a compressor 13, is maintained under pressure in a tank 14 into which it is led by pipe 15. The tank 14 is fitted with cooling fins on the outside, and therein circulates, through a coil 21, cold dried air. At the outlet of tank 14 is fitted a pipe 16 which leads to a vaporizer 17, from which the cooling fluid, expanding in the coil 18, keeps at low temperature the non-freezing liquid in the tank 11, then resumes its cycle.

The compressed, dried and cold air from the manifold 5", which entered the pipe 20, follows at its point two separate paths. Part of it, through the first section of pipe 20, enters the pipe 22 and, circulating in the said coil 21, cools the cooling fluid of tank 14. Below this coil, pipe 22 is divided into two branches 25 and 26, substantially symmetrical, each of which leads into a trough 27 into which is fitted a manifold 28, (Fig. 5) from which branch off several pipes 29 which run parallel to the edges of the runway and are of various lengths, i.e. stop at various points of the latter, inside the troughs 27.

Figure 2:
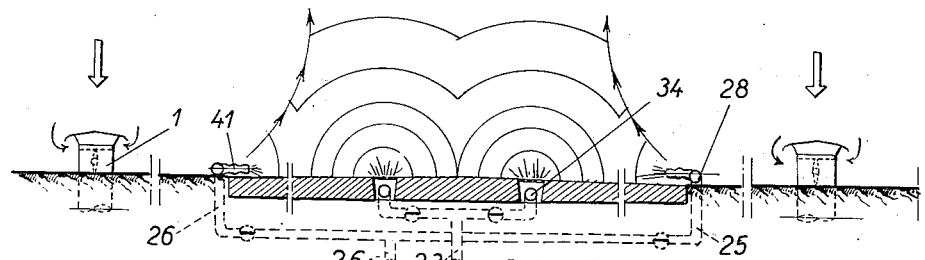
Fig. 2 is a cross section of the runway when the plant operates symmetrically, i.e. in the absence of wind.

The compressed and dried air which does not flow into pipe 22, but follows pipe 20, circulates in space 7' in backflow to the outer walls of the compressor 3 and of the first section 5 of the compressed-air pipe. From this space the air enters pipe 23 at a temperature higher than that of pipe 22, because it has cooled pipe 5 and compressor 3. Also this pipe 23 branches out into two substantially symmetrical sections 31 and 32 which lead to the center trough 33 in which is laid manifold 34 (Figs. 2 and 6) from which branch out, as the barrels of an organ, several pipes 36 of different length which reach various points of the length of the runway, the two parallel troughs being maintained at a distance of six to eight meters to each other. A perforated plate covers the troughs and prevents airplane wheels from falling thereinto.

Figure 7:
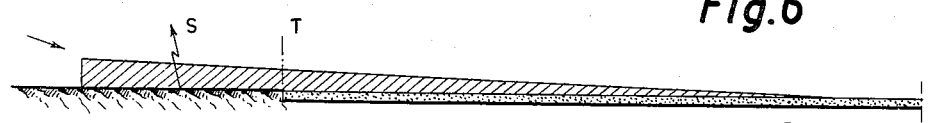
Fig. 7 is a side view of the runway showing, cross-hatched, the vertical area which the plant must clear from fog.

With special reference to Figure 7, it should be said here that the purpose of the installation described herein is to create, ahead of the landing aircraft, a corridor of clear air, enabling the pilot to safely effect the last stage of the landing procedure in normal conditions of visibility, this clear space being confined to the direction of the landing aircraft. The shape of the space to be cleared from fog needs not to be a parallelepiped as long and as wide as the runway, and as high as the altitude of the aircraft coming in above the radio marker. Taking into account the aircraft's progressive descent (glide angle), it will always be sufficient for the defogged area to be a wedge suitably oriented with respect to the direction of landing, of the shape shown in Fig. 7, where S is the radio marker vertical and T the beginning of the runway.

Figure 5:
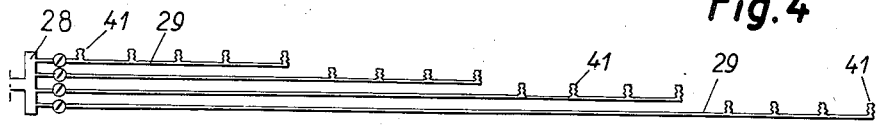
Figs. 5 and 6 represent details of the side and central air distribution pipes.

With reference to Fig. 5, the pipes 29 laid in the troughs 27 are fitted, at convenient intervals, with air outlets upon which are fitted sections of flexible pipe of rubber or similar material, which can be turned towards the center of the runway or away from it. From these pipes flows under pressure dry and comparatively cold air. Since this air, due to its conditions of temperature and lack of moisture, is denser than the ambient air and has a lower specific heat, it will drive upwards the dry and hot air distributed by the pipes 36 which, as indicated above, are laid in the center runway trough.

Figure 6:
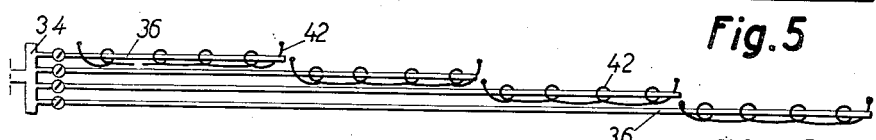

Fig. 6 is a plan view of the arrangement of the pipes 36 laid into the troughs 33 (Fig. 1) which are fitted, at their terminal end, with a number of holes, and are wrapped with electrical resistances 42, intended to heat the air after expansion to a sufficient temperature for it, after mixing with the ambient air, to assume the density corresponding to the depth of the area to be cleared from fog, taking into account the fact that the heat gradient of 1° C. per 100 meters of altitude indicates that for each degree C. of temperature above the ambient temperature, the air assumes a density corresponding to a 100-meter difference in altitude.

Figure 3:
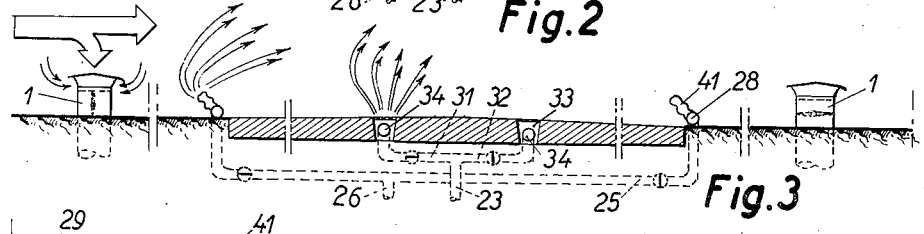
Fig. 3 shows the same cross section when the plant is caused to operate asymmetrically, because of the presence of wind, which in this case blows across the axis of the runway.
Figure 4:
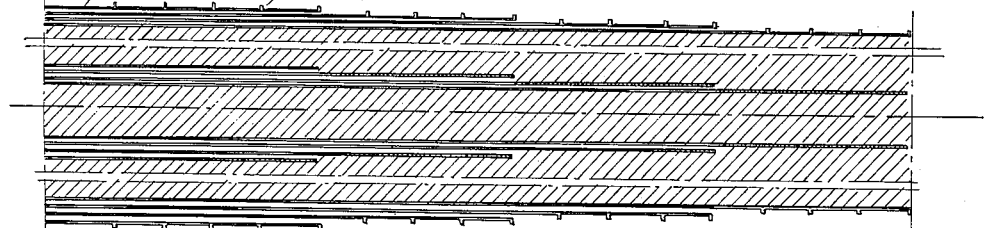
Fig. 4 shows, in reduced scale, a partial plan view of the runway.

In the case of wind blowing across the runway, the entire power of the plant, in suction and compression, is concentrated on the upwind half, as clearly shown in Fig. 3. In the case of wind blowing along the runway, the air will be sent prevalently through the terminal outlets.

The plant described above, is fitted with valves, gates, cocks, by-pass valves and any other components required to regulate the flow of air in the selected pipes, and of potentiometers to adjust the air temperature as needed, by varying the current flow through the resistance 42. These control and regulation organs are of known type, and for this reason they are not particularly represented and described, and the same is said of the equipment for the remote control of such organs. It will be understood, therefore, that the plant described does not have a fixed pattern of operation, but lends itself to any combination in relation to the particular conditions of wind, relative moisture and temperature, and is controlled, from the tower or other suitable location, by a single operator.

What I claim is:

A fog dispersing system, comprising a plurality of intakes for drawing ambient air, a manifold connected with said intakes, a compressor having a suction end connected to said manifold, a pipe connected with the compression end of said compressor, a casing enclosing said compressor and said pipe, blades carried by said pipe and located between said pipe and said casing, another manifold connected with said pipe, a plurality of boxes connected with said other manifold, a cooling tank enclosing said boxes, tie rods within said boxes, a third manifold connected with said boxes and receiving cooled compressed air from said boxes, a pipe connected with said third manifold and the interior of said casing, a compressor for a cooling fluid, a coil located in said cooling tank and connected with said compressor, another tank, another coil in said other tank, another pipe connecting the first-mentioned coil with said other tank, a third pipe connecting said compressor with said other tank, a fourth pipe connecting the first-mentioned pipe with said other coil, a plurality of troughs for releasing dehydrated cooled air, and means connecting said casing and said other coil with said troughs.

(References on following page)

References Cited in the file of this patent

UNITED STATES PATENTS

| | | |
|---|---|---|
| 652,178 | Gayley | June 19, 1900 |
| 2,375,069 | Bennett | May 1, 1945 |

FOREIGN PATENTS

| | | |
|---|---|---|
| 587,521 | Great Britain | Apr. 29, 1947 |
| 632,103 | France | Jan. 4, 1928 |
| 842,643 | France | June 15, 1939 |

OTHER REFERENCES

"On the Local Dissipation of Natural Fog," by H. G. Houghton et al., Papers in Physical Oceanography and Meteorology, volume VI, Number 3, October 1938, pages 23 and 24.